United States Patent [19]
Ramsey

[11] 3,930,777
[45] Jan. 6, 1976

[54] PLASTIC U-SHAPED RETURN CONDUIT AND APPARATUS AND METHOD FOR MOLDING THE SAME

[76] Inventor: William C. Ramsey, 401 N. Union St., Bryan, Ohio 43506

[22] Filed: Dec. 11, 1974

[21] Appl. No.: 531,489

[52] U.S. Cl. ............... 425/190; 264/328; 425/242 R; 425/438; 425/444; 425/468
[51] Int. Cl.² ...................... B29C 1/14; B29C 7/00
[58] Field of Search ........ 425/190, 242 R, 444, 438, 425/468; 264/328

[56] References Cited
UNITED STATES PATENTS

| | | | |
|---|---|---|---|
| 3,028,630 | 4/1962 | Walker | 264/328 |
| 3,222,727 | 12/1965 | Ford et al. | 425/438 X |
| 3,711,590 | 1/1973 | Deutsch | 264/328 X |
| 3,746,493 | 7/1973 | Stalter | 425/438 X |
| 3,849,053 | 11/1974 | Bruce et al. | 425/468 X |

*Primary Examiner*—Robert L. Spicer, Jr.
*Attorney, Agent, or Firm*—Jacox & Meckstroth

[57] ABSTRACT

A molded plastic J-shaped trap or conduit has a U-portion with a laterally curved or slightly helical configuration to provide for automatically producing the conduit within a multiple cavity injection mold. The mold includes a set of mold sections which define a U-shaped cavity having a slight helical configuration, and a slight helical U-shaped core member is supported within the cavity by a core support rod and a set of core slides which engage opposite ends of the core member. The core member and one of the core slides are adapted to be elevated after the mold sections are opened to remove a molded conduit from the cavity, and the core member remains supported by the core support rod which extends through the one core slide. The molded conduit is stripped from the core member by an annular stripping plate which is moved by an actuator along the core member in a helical path, and the conduit is directed past the core support rod as the conduit is being stripped.

12 Claims, 9 Drawing Figures

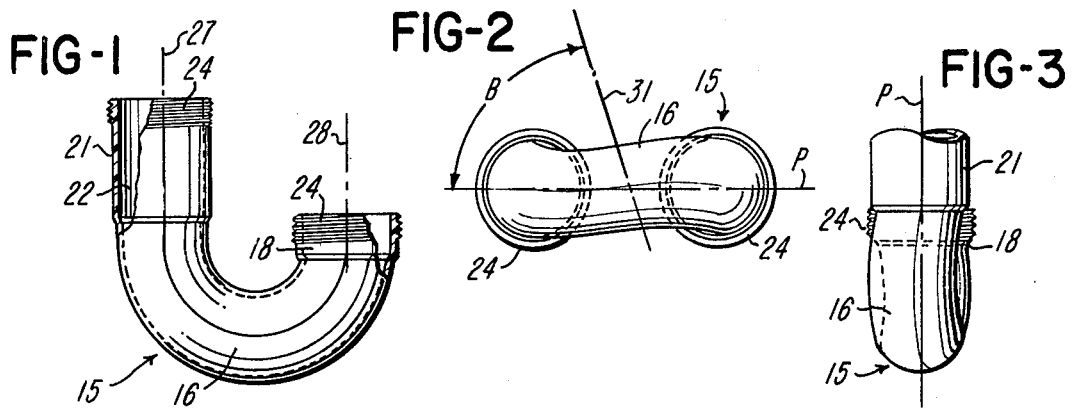
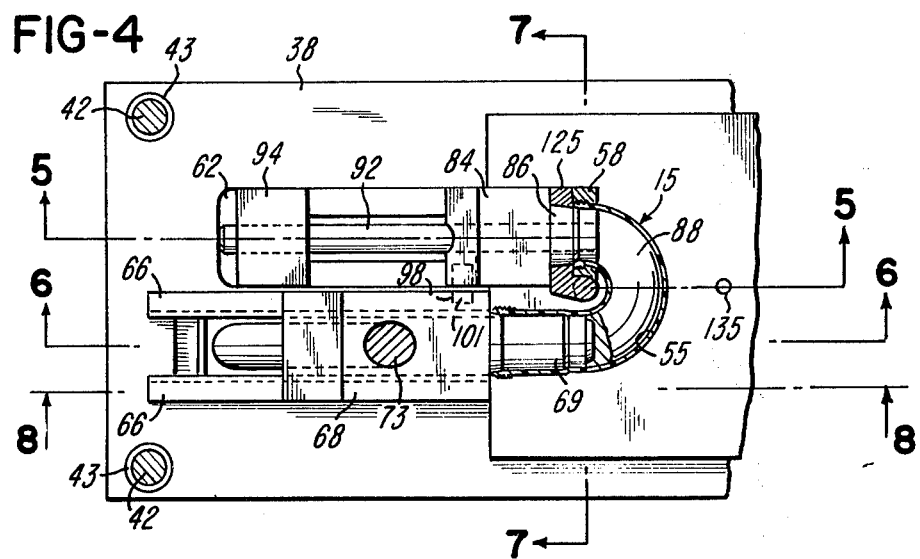
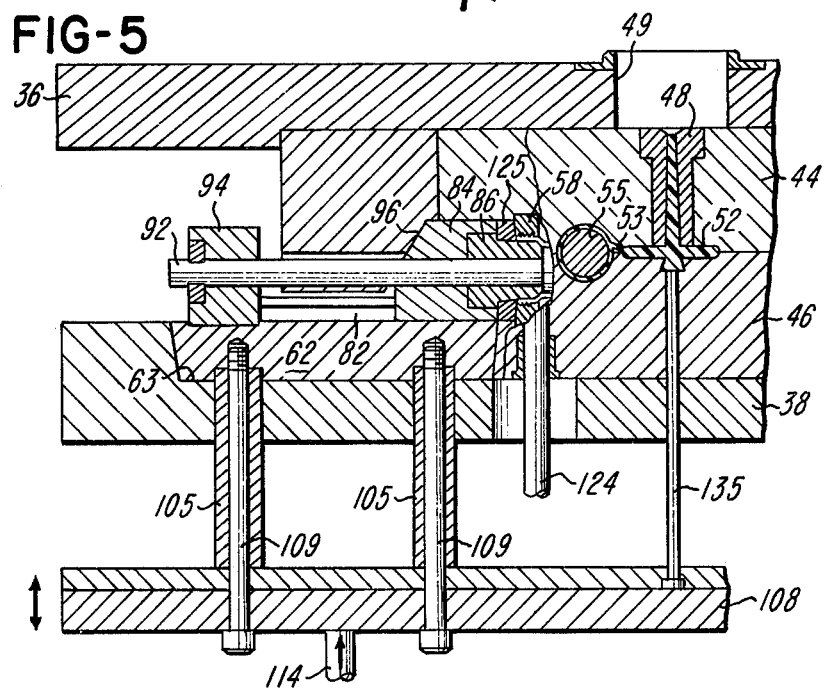

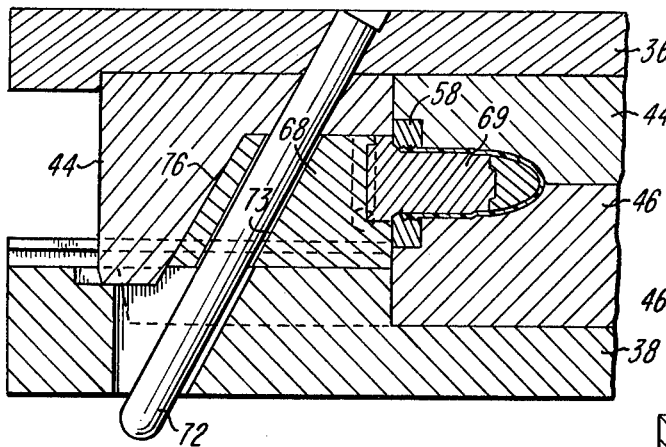
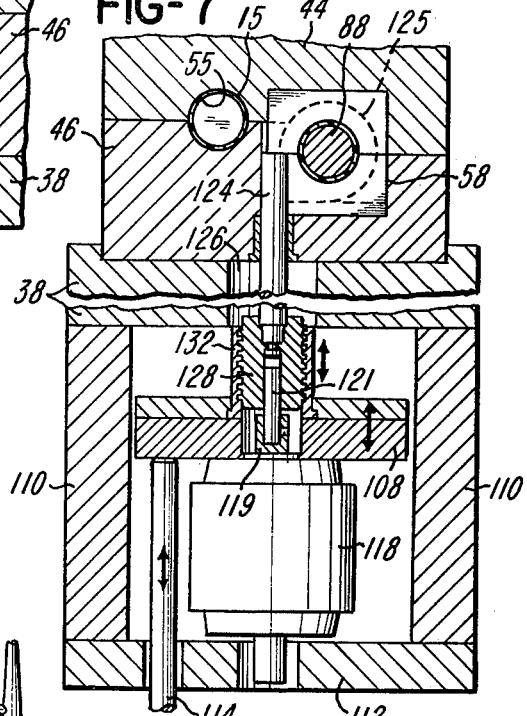
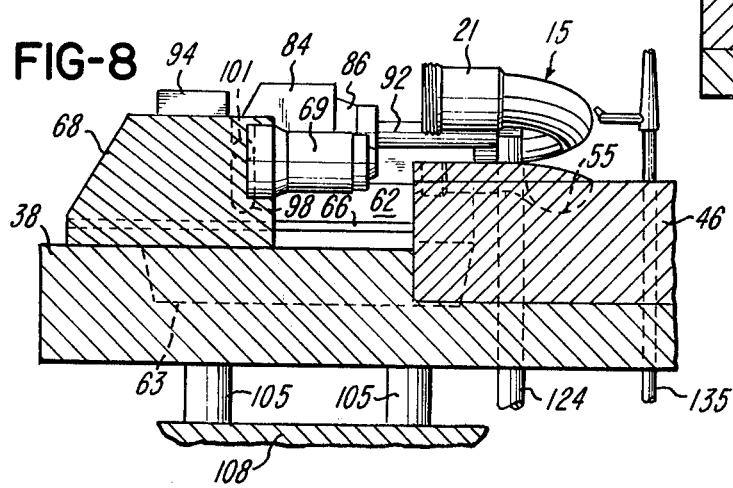
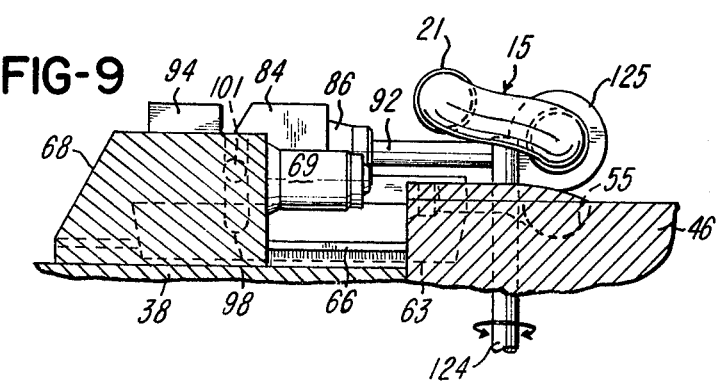

PLASTIC U-SHAPED RETURN CONDUIT AND APPARATUS AND METHOD FOR MOLDING THE SAME

BACKGROUND OF THE INVENTION

In the production of J-traps which are molded of a rigid plastics material, it is desirable for the U-shaped channel or passage to be of substantially uniform circular cross-section with minimum internal seams and without internal flash. Thus it is desirable to use a one-piece U-shaped core element instead of sectional core elements or members such as those disclosed, for example, in U.S. Pat. No. 454,186 for molding lead traps. A one-piece U-shaped core element may be used in the molding of a flexible J-trap or tube, for example, as disclosed in U.S. Pat. No. 3,028,630, since the flexible trap may be deformed when it is removed from the core element. However, a one-piece U-shaped core element is difficult or awkward to remove from a molded J-trap or tubular conduit when the conduit is molded of a rigid plastics material.

It is also desirable to eliminate all manual operations involved in inserting and removing core sections or elements during the molding of a rigid plastics J-trap or conduit so that the molding operation may be completely automatic and the cost of the conduit is minimized. In the art of injection molding L-shaped conduits or elbows, multiple cavity molds have been constructed or proposed for automatically producing the elbows without any manual operations. For example, U.S. Pat. Nos. 3,632,277 and 3,746,493 disclose multiple cavity molds for automatically producing elbows of rigid plastics material. However, the molds disclosed in these patents are not adaptable for molding U-shaped or "return" conduits such as J-traps or other conduits having a "return bend."

SUMMARY OF THE INVENTION

The present invention is directed to the automatic production of return conduits including J-traps and any other conduits having a U-shaped portion. A return conduit produced in accordance with the invention differs from a conventional return conduit in that the U-shaped portion of a conduit of the invention has a slight helical configuration or a center line which curves laterally outwardly relative to a plane defined by the parallel axes of the circular end portions of the return conduit. This configuration of the return conduit provides for automatically producing the conduits without manually handling or positioning any inserts or core elements within the mold and also permits the conduits to be produced in a multiple cavity mold. The specific construction of the mold and other features and advantages of the invention will be apparent from the following description, the accompanying drawings and the appended claims.

BRIEF DESCRIPTION OF THE DRAWINGS

FIG. 1 is a side view of a J-trap constructed in accordance with the invention;

FIG. 2 is a bottom view of the J-trap shown in FIG. 1;

FIG. 3 is a fragmentary edge view of the J-trap shown in FIGS. 1 and 2;

FIG. 4 is a fragmentary plan view of a lower section of the mold constructed in accordance with the invention to produce the J-trap shown in FIGS. 1-3 and with a portion of the mold shown in section;

FIG. 5 is a fragmentary vertical section of both sections of the mold, taken generally on the line 5—5 of FIG. 4;

FIG. 6 is a fragmentary section of the mold taken generally on the line 6—6 of FIG. 4;

FIG. 7 is a fragmentary section of the mold taken generally on the line 7—7 of FIG. 4;

FIG. 8 is a fragmentary section of only the lower mold section taken generally on the line 8—8 of FIG. 4 and showing a molded J-trap after it is elevated from its corresponding mold cavity; and FIG. 9 is a fragmentary section similar to FIG. 8 and showing the molded J-trap as it is being stripped from the core member.

DESCRIPTION OF THE PREFERRED EMBODIMENT

Referring to FIGS. 1–3, a return conduit in the form of a J-trap 15 is molded of a rigid plastics material in accordance with the invention and includes a U-shaped portion 16 which integrally connects opposite cylindrical end portions 18 and 21. The portions 16, 18 and 21 cooperate to define a J-shaped channel or passage 22 of circular cross-section, and external threads 24 are molded as an integral part of each of the end portions 18 and 21 to provide for connecting the trap 15 to corresponding fluid lines or other conduits. The end portions 18 and 21 have corresponding parallel axes 27 and 28 which define a reference plane P (FIGS. 2 and 3). As also illustrated in FIGS. 2 and 3, the U-shaped portion 16 of the trap 15 has a slight helical configuration with a helix axis 31 extending at an acute angle B relative to the reference plane P. Thus the center line of the U-shaped portion 16 curves outwardly and laterally on opposite sides of the reference plane P as is apparent from FIG. 3.

The return conduit or J-trap shown in FIGS. 1–3 is adapted to be automatically produced within a generally rectangular multiple cavity mold which is shown in FIGS. 4–9. Since the mold is symmetrical with respect to a plane extending laterally through the center of the mold, only one end portion of the mold is shown and will be described in detail. In general, the mold includes an upper mold plate or platen 36 (FIG. 5) and a parallel spaced lower mold plate or platen 38. The upper platen 36 is supported for vertical movement relative to the lower platen 38 by a set of corner guide rods 42 and corresponding bearings 43.

An upper mold section 44 is secured to the upper mold platen 36, and mating lower mold section 46 is secured to the lower mold platen 38 so that the mold sections move between open and closed positions in response to movement of the upper mold platen 36 relative to the lower mold platen 38. A sprue bushing 48 extends through the center of the upper mold section 44 and is adapted to receive the nozzle of an injection molding machine (not shown) which projects through a concentric cylindrical opening 49 formed within the center of the upper mold platen 36. The sprue bushing 48 extends to a runner cavity 52 defined by the mold sections 44 and 46, and the fluid plastics material is fed through a set of inclined ports 53 within the upper mold section 44 to a corresponding set of J-shaped cavities 55 defined between the mating mold sections 44 and 46. Each of the mold cavities 55 has a configuration which corresponds to the external surface of the J-trap 15, with the U-shaped portion of the cavity having a slight helical configuration. A set of split nuts or inserts 58 are secured to the corresponding mold sections 44 and 46 at the opposite ends of the cavity 55 and provide for molding the threads 24 on the opposite ends of the trap 15.

A rectangular slide support platform or plate 62 has a tapered outer peripheral surface and is recessed within a correspondingly shaped cavity 63 formed within the lower mold platen 38. A set of parallel spaced guide tracks 66 (FIG. 4) are secured to the lower mold platen 38 and support a slide member 68 (FIGS. 4 and 6) for lateral movement relative to the mold sections 44 and 46. The slide member 68 supports a core element 69 (FIG. 8) which projects into one end portion of the cavity 55 and cooperates therewith to form the end portion 21 of the trap 15.

The lateral movement of the slide member 68 and the core element 69 on the guide tracks 66 is produced by an elongated camming member or rod 72 (FIG. 6) which is rigidly secured to the upper mold platen 36 and projects downwardly at an inclined angle through an inclined opening or hole 73 formed within the slide member 68. Thus the slide member 68 moves from its closed or extended position (FIG. 6) to its retracted position (FIG. 8) in response to movement of the upper mold platen 36 and mold section 44 from its closed position (FIG. 6) to its open position. When the slide member 68 is in its closed position an inclined wedge surface 76 (FIG. 6) on the upper mold section 44 engages a mating inclined surface on the outer end of the slide member 68 and is effective to clamp the slide member in its extended position shown in FIG. 5 so that the core element 69 is firmly positioned within one end of the cavity 55.

Referring to FIG. 5, the slide support plate 62 has a set of guide tracks 82 which extend parallel to the guide tracks 66 and support a slide member 84 for movement between an extended position (FIG. 5) and a retracted position (FIG. 8). The slide member 84 supports an annular core element 86 which is adapted to project into the opposite end of the cavity 55 and cooperate therewith for molding the shorter end portion 18 of the trap 15. As shown in FIG. 4, when the core elements 69 and 86 are in their extended positions, they engage opposite ends of a generally U-shaped core member 88 which has a slight helical configuration corresponding to that of the cavity 55.

The core member 88 is also supported by an elongated tubular rod 92 (FIG. 5) which extends through the slide member 84 and the annular core element 86 and has one end portion rigidly connected to the adjacent end of the core member 88. The opposite end portion of the rod 92 is rigidly supported by a block 94 mounted on the slide support plate 62. The cylindrical opening within the slide member 84 and core element 86 has sufficient clearance to permit the slide member and core element to move laterally along the guide tracks 82 on the slide support plate 62. Preferably, the center passage within the tubular rod 92 provides for directing coolant through the core element 86 and the U-shaped core member 88. As also shown in FIG. 5, an inclined clamping surface 96 is formed on the upper mold section 44 for engaging a corresponding mating surface on the slide member 84 when the mold sections are closed for clamping the core element 86 firmly against the corresponding end of the core member 88.

Referring to FIGS. 4, 6 and 8, a U-shaped slot or recess 98 is formed within a side surface of the slide member 68 and receives a pin or stud 101 which projects outwardly from the adjacent side of the slide member 84. The stud 101 and slot 98 assure that the slide member 84 shifts or moves laterally with the slide member 68, while permitting the slide member 84, the support rod 92 and the core member 88 to move vertically with the slide support plate 62 and relative to the slide member 68, as illustrated in FIG. 8.

A pair of tubular posts 105 (FIG. 5) extend through corresponding clearance holes within the lower mold platen 38 and project downwardly from the slide support plate 62 to an actuating plate 108 which is positioned below the lower mold platen 38 in parallel spaced relation. A set of elongated screws 109 extend through the posts 105 for rigidly securing the support plate 62 to the actuating plate 108. The actuating plate 108 is positioned for vertical movement between a pair of parallel spaced stationary side plates 110 (FIG. 7) which are mounted on a stationary base plate 112 and support the lower mold platen 38. The vertical movement of the actuating plate 108 is produced by vertical movement of a set of rods 114 which project upwardly through clearance holes within the base plate 112 and engage the bottom of the actuating plate 108. The rods 114 form part of the "knock out" or ejector system of the injection molding machine.

A rotary actuator such as a hydraulic or fluid actuated motor 118 (FIG. 7) of the oscillating vane type, is mounted on the actuating plate 108 for movement therewith and includes a shaft 119 which is rigidly connected to a shaft extension 121 aligned axially with a shaft 124 which projects upwardly through the center of an opening 126 formed within the lower mold platen 38. An annular stripping member 125 (FIG. 4) is rigidly secured to the upper end portion of the shaft 124 and is adapted to receive the core element 86 adjacent the corresponding end of the cavity 55. A cam member in the form of a coupling 128 (FIG. 7) is rigidly secured to the shaft 124 and is keyed or splined to the shaft extension 121 so that the coupling 128 may move axially on the shaft extension.

The coupling 128 has external threads which engage internal threads formed within a cam follower in the form of a cylindrical sleeve 132 secured to the actuating plate 108. The pitch of the helical threads corresponds to the pitch of the helical cavity 55 and helical core member 88 so that when the stripping member 125 is rotated or oscillated about the axis of the motor shaft 119, the stripping member 125 follows the U-shaped core member 88, since the coupling 128 and shaft 124 are free to shift axially on the splined shaft extension 121.

When the mold described above in connection with FIGS. 4-8 is operated or used for producing J-traps 15, the fluid plastics material is injected into the J-shaped cavities 55 after the mold sections 44 and 46 are moved to their closed position shown in FIGS. 5 and 6. A J-trap 15 is formed or molded within each of the cavities 55, and the mold sections are cooled by the circulation of coolant within passages (not shown) formed within the mold sections. The mold sections 44 and 46 are then opened by movement of the upper mold section 44 relative to the lower mold section 38, causing the slide members 68 and 84 and their corresponding core elements 69 and 86 to be cammed or shifted laterally to their retracted positions (FIG. 8).

The actuating plate 108 is then elevated so that the rod 92 and the U-shaped core member 88 move upwardly and thereby lift the molded trap or conduit out of the portion of the cavity 55 within the lower mold section 46 (FIG. 8). The motor 118 is actuated to rotate the stripping member 125 clockwise (FIG. 4) and in a helical path so that the molded J-trap is stripped from the U-shaped core member 88, as shown in FIG. 9. When the J-trap 15 is stripped from the core member 88, the movement of the J-trap in the helical path permits the end portion 21 to pass above the rod 92 (FIG. 9) which supports and carries the core member 88. After the J-trap is stripped from the core member, it is free to drop into a receiving bin or container, or be otherwise automatically removed from between the mold sections.

As apparent from FIG. 5, when the actuating plate 108 is elevated by movement of the ejector rods 114, a sprue removal pin 135 moves with the actuating plate 108 for ejecting the scrap material formed within the sprue bushing 48 and runner cavity 52 from the portion of the cavity within the lower mold section 46. As a result of each port 53 being formed within the upper mold section 44, the scrap material within the port 53 is sheared from the molded J-trap 15 when the upper mold section 44 is elevated to open the mold. Thus when each J-trap 15 is stripped from the corresponding core member 88, it is a finished part, and no secondary operation is required to remove a scrap runner or sprue.

From the drawings and the above description, it is apparent that a return conduit constructed in accordance with the present invention, provides the important feature of completely automated production or molding of a return conduit without requiring any manual positioning of inserts within the mold and/or manual removing of core elements from a molded conduit. In addition, there is no internal seam within the U-shaped portion 16, and internal flash is eliminated by the cooperation between the core elements 69 and 86 and the core member 88. Furthermore, while the trap and method and apparatus for producing the trap herein described constitute a preferred embodiment of the invention, it is to be understood that the invention is not limited to the precise trap and method and apparatus described, and that changes may be made therein without departing from the scope and spirit of the invention as described in the appended claims.

I claim:

1. Apparatus for molding a U-shaped tubular conduit, comprising a first mold section and a second mold section adapted to be moved between opened and closed positions and cooperating to define a generally U-shaped cavity, a generally U-shaped core member disposed within said cavity and having opposite end portions, a first support member connected to one of said end portions of said core member, a second support member connected to the other of said end portions of said core member, means for injecting a moldable material into said cavity to form a molded conduit, means for retracting said second support member from said core member when said mold sections are in their open position, means for stripping the molded conduit from said core member after said second support member is retracted, and means for directing the molded conduit past said first support member when the conduit is stripped from said core member.

2. Apparatus as defined in claim 1 wherein said second support member includes a core element projecting into said cavity for engaging said core member, a first slide member supporting said core element, and means for moving said slide member between retracted and extended positions in response to movement of said mold sections between said open and closed positions.

3. Apparatus as defined in claim 2 wherein said means for moving said slide member comprise an elongated inclined rod supported by one of said mold sections, and said rod is effective to cam said slide member between said retracted and extended positions.

4. Apparatus as defined in claim 2 wherein said first support member includes an elongated support rod, an annular core element surrounding said rod and projecting into said cavity adjacent said core member, and a second slide member supported for longitudinal movement relative to said support rod and supporting said annular core element for movement between extended and retracted positions relative to said core member.

5. Apparatus as defined in claim 4 including means for moving said second slide member, said support rod and said annular core element as a unit between retracted and elevated positions relative to said second mold section to facilitate removing a molded conduit from said core member when said mold sections are in said open positions.

6. Apparatus as defined in claim 4 including means for moving one of said slide members between its retracted and extended positions in response to movement of the other of said slide members between said retracted and extended positions.

7. Apparatus as defined in claim 1 wherein said means for stripping a molded conduit from said core member, comprise an annular stripping member, means supporting said stripping member for both rotary and axial movement on a predetermined axis, and power actuated means for moving said stripping member.

8. Apparatus as defined in claim 7 including means for moving said stripping member along a predetermined helical path in response to operation of said power actuated means.

9. Apparatus for molding a U-shaped tubular conduit, comprising a first mold section and a second mold section adapted to be moved between opened and closed positions and cooperating to define a generally U-shaped cavity having a slight helical configuration, a generally U-shaped core member having a slight helical configuration and disposed within said cavity, said core member having opposite end portions, a first core element connected to one of said end portions of said core member, a first slide member supporting said first core element, a second core element connected to the other of said end portions of said core member, a second slide member supporting said second core element, means for injecting a moldable material into said cavity to form a molded conduit, means for retracting said slide members and said core elements from said core member when said mold sections are in their open position, a support rod extending through said first core element and supporting said core member when said slide members and core elements are retracted, and means for stripping the molded conduit from said core member and past said support rod after said second core element is retracted.

10. Apparatus as defined in claim 9 wherein said means for stripping the molded part from said core member comprise a stripping member connected to a rotary actuator, and means for moving said stripping along a helical path in response to operation of said actuator.

11. A method of molding a U-shaped conduit, comprising the steps of forming a generally U-shaped cavity within a set of mating first and second mold sections, adapted to be moved between opened and closed positions, supporting a generally U-shaped core member within said cavity by first and second support members connected to opposite ends of said core members, supporting said second support member for lateral movement between retracted and extended positions relative to the corresponding end of said core member, injecting a fluid plastics material into said cavity and around said core member to form a molded conduit, moving said mold sections to said open position after the material has cured, moving said second support member to said retracted position, stripping the molded conduit from said core member, and directing the molded conduit past said first support member as the conduit is being stripped from said core member.

12. A method as defined in claim 11 including the steps of forming said cavity with a slight helical configuration, and constructing said core member with a corresponding slight helical configuration to provide for directing the molded conduit past said first support member during the stripping operation.

\* \* \* \* \*